(12) United States Patent
Kraus

(10) Patent No.: US 10,588,269 B2
(45) Date of Patent: Mar. 17, 2020

(54) BALER WITH ROTATABLE COMPRESSION SURFACE

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 636 days.

(21) Appl. No.: 15/292,008

(22) Filed: Oct. 12, 2016

(65) Prior Publication Data

US 2018/0098508 A1    Apr. 12, 2018

(51) Int. Cl.
*A01F 15/04*    (2006.01)
*A01F 15/10*    (2006.01)

(52) U.S. Cl.
CPC ............ *A01F 15/10* (2013.01); *A01F 15/042* (2013.01)

(58) Field of Classification Search
CPC .... B30B 1/00; B30B 1/06; B30B 1/14; B30B 1/26; B30B 1/263; B30B 1/266; B30B 1/268; B30B 9/30; B30B 9/305; A01F 15/00; A01F 15/04; A01F 15/042; A01F 15/0841; A01F 15/10; A01F 2015/102; A01F 15/0825; A01D 69/00; A01D 69/005; A01D 69/02; A01D 69/03
USPC .... 100/214, 226, 228, 233, 188 R, 179, 189
See application file for complete search history.

(56) References Cited

U.S. PATENT DOCUMENTS

| | | | |
|---|---|---|---|
| 4,168,659 A | 9/1979 | Yatcilla et al. |
| 4,280,403 A | 7/1981 | Alderson |
| 4,624,180 A | 11/1986 | Strosser |
| 4,627,341 A | 12/1986 | Sudbrack et al. |
| 4,756,244 A | 7/1988 | Strosser |
| 6,257,131 B1 | 7/2001 | Wilkens et al. |
| 6,651,416 B2 | 11/2003 | Trelstad et al. |
| 7,047,719 B2 | 5/2006 | Dubois |

(Continued)

FOREIGN PATENT DOCUMENTS

DE    3941092    12/1990
EP    2181581 A1    5/2010
(Continued)

OTHER PUBLICATIONS

Kirkpatrick, Allan, "Slider Crank Model," Feb. 20, 2001, Colorado State University, Web: https://www.engr.colostate.edu/~allan/thermo/page2/page2.html (Year: 2001).*

(Continued)

*Primary Examiner* — Shelley M Self
*Assistant Examiner* — Katie L. Parr
(74) *Attorney, Agent, or Firm* — Michael Best & Friedrich LLP

(57) ABSTRACT

A baler including a frame, a feed system coupled to the frame, a baling chamber defining an axis therethrough, a crank arm, and a plunger being at least partially positioned within and movable with respect to the baling chamber. Where the plunger includes a compression surface and defines a compression plane and fixed with respect to the compression surface, where the compression plane defines a compression angle with respect to the axis of the baling chamber, and wherein the compression angle is adjustable independently of the rotation of the crank arm.

18 Claims, 9 Drawing Sheets

(56) References Cited

U.S. PATENT DOCUMENTS

| | | | |
|---|---|---|---|
| 7,096,780 B1* | 8/2006 | Hawkins | B30B 9/3007 |
| | | | 100/215 |
| 8,069,781 B2 | 12/2011 | Lang | |
| 8,578,846 B2* | 11/2013 | Sherwood | B30B 9/3021 |
| | | | 100/245 |
| 9,392,748 B2* | 7/2016 | Vande Ryse | A01F 15/101 |
| 2010/0107588 A1* | 5/2010 | Lang | A01F 15/042 |
| | | | 56/341 |
| 2013/0047867 A1 | 2/2013 | Van De Laarschot et al. | |
| 2013/0180417 A1* | 7/2013 | Vandamme | A01F 15/0825 |
| | | | 100/35 |
| 2014/0090568 A1 | 4/2014 | Missotten et al. | |
| 2014/0305322 A1 | 10/2014 | Galant et al. | |
| 2015/0342120 A1 | 12/2015 | O'Reilly | |
| 2016/0113206 A1 | 4/2016 | Kraus | |
| 2016/0121385 A1* | 5/2016 | Butcher | B21D 24/00 |
| | | | 413/69 |

FOREIGN PATENT DOCUMENTS

| | | | | |
|---|---|---|---|---|
| EP | 2962543 A2 | | 1/2016 | |
| FR | 2754973 A1 * | | 4/1998 | A01F 15/042 |
| GB | 187393 A | | 10/1922 | |

OTHER PUBLICATIONS

European Search Report issued in counterpart application No. 17195770.7 dated Feb. 26, 2018. (6 pages).

* cited by examiner

BALER WITH ROTATABLE COMPRESSION SURFACE

BACKGROUND

The present disclosure relates to an agricultural baler having a compression system for forming bales of crop.

SUMMARY

Large square balers have been used for harvesting hay for many years. Their primary advantage over other types of balers is that they densify the crop into large rectangular-shaped bales, which minimizes both shipping and storage costs. Currently, there is a desire to create bales with higher density, which requires higher plunger forces and thus higher loads on the elements of the drive train (i.e., the connecting rod, gearbox, crank arm, and the like). As such, current baler designs require increasingly more expensive components in the drive train to allow for such large plunger forces.

In one aspect, a baler including a frame, a feed system coupled to the frame, a baling chamber defining an axis therethrough, a crank arm, and a plunger being at least partially positioned within and movable with respect to the baling chamber. Where the plunger includes a compression surface and defines a compression plane fixed with respect to the compression surface, where the compression plane defines a compression angle with respect to the axis of the baling chamber, and wherein the compression angle is adjustable independently of the rotation of the crank arm.

In another aspect, a baler including a frame, a feed system coupled to the frame, a baling chamber defining an axis therethrough, a crank arm defining a crank throw length, and a plunger positioned within and moveable with respect to the baling chamber. Where the plunger includes a compression surface and defines a compression plane fixed with respect to the compression surface, where the compression plane defines a compression angle with respect to the axis of the baling chamber, where the compression angle is adjustable, where the plunger defines a plunger stroke length, and wherein the plunger stroke length is greater than the crank throw length.

In still another aspect, a baler including a frame, a feed system coupled to the frame, a baling chamber defining an axis therethrough, a crank arm having a first crank mounting point, a plunger positioned within and moveable with respect to the baling chamber, the plunger having a compression surface and defining a compression plane fixed with respect to the compression surface, where the compression plane defines a compression angle with respect to the axis of the baling chamber, and wherein the compression angle is adjustable. The baler also including a first connecting arm extending between and coupled to the plunger closer to a top edge of the compression surface than a bottom edge of the compression surface and the crank arm at the first crank mounting point, and a second connecting arm extending between and coupled to the plunger closer to the bottom edge of the compression surface than the top edge of the compression surface and the crank arm at the first crank mounting point.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to a baler, and more particularly to baler having a plunger with a compression surface whose angle with respect to the baler chamber can be altered during the compression process. More specifically, the baler includes a plurality of variable-length connecting rods that permit the angular orientation of the compression surface to be adjusted. By doing so, the baler can achieve larger bale densities while limiting the forces experienced by the gearbox of the baler. Furthermore, the variable-length connecting rods permit the baler to achieve greater compression surface angle deviations than that possible with a fixed length connector arm. Still further, the variable-length connecting rods permit the baler to finely tune the reciprocating motion of the plunger, or plunger stroke, with respect to the baling chamber.

Figure 1:
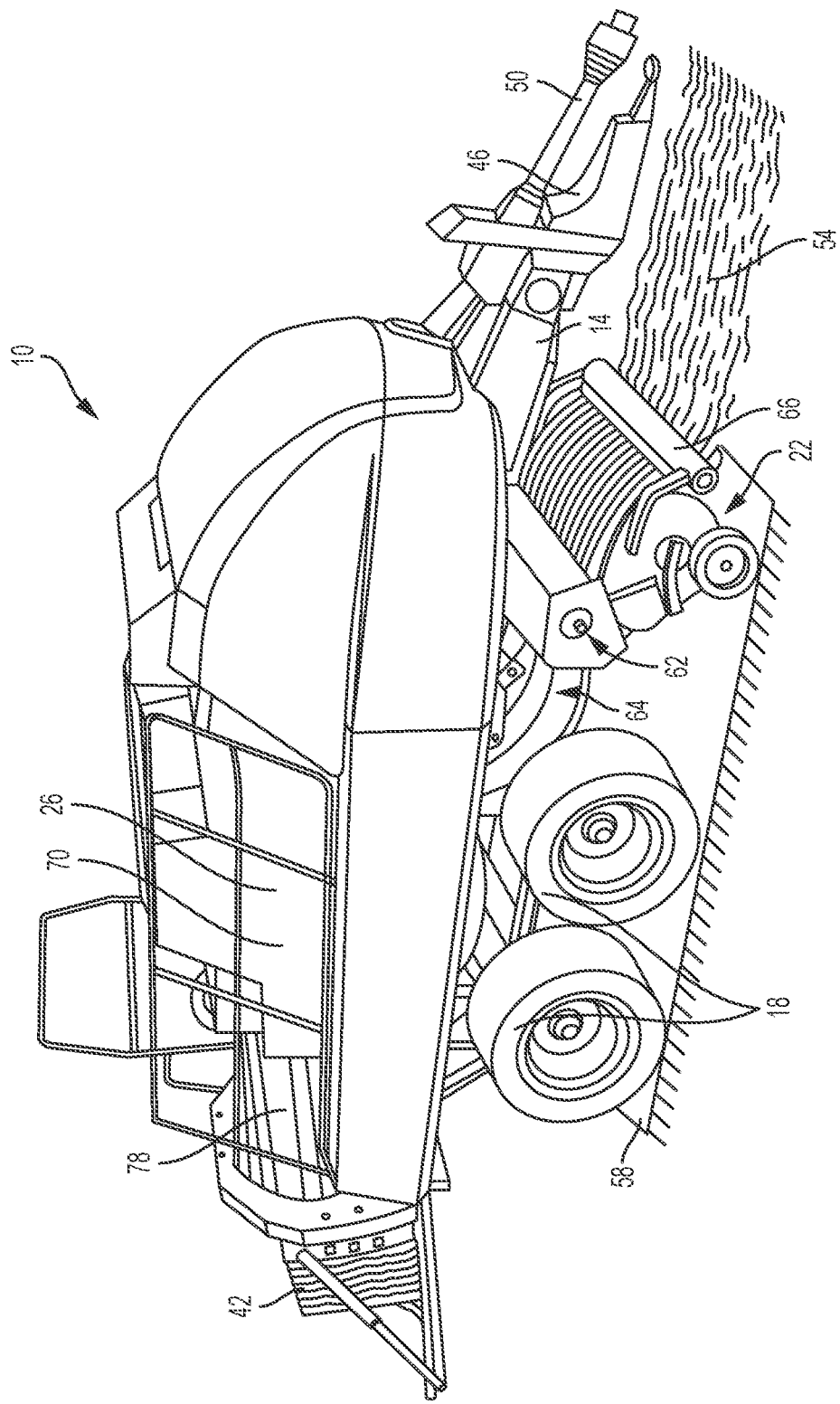
FIG. 1 is a perspective view of a baler, having a rotatable plunger in accordance with one implementation of the present disclosure.

Referring to FIG. 1, a baler 10 includes a frame 14, a set of wheels 18 mounted on the frame 14, a feed system 22 coupled to the frame 14, a compression system 26 having a plunger assembly 82 (FIG. 2) to receive and compress crop material 54 provided by the feed system 22, and a controller 38 to monitor and direct the baling operation. In the illustrated implementation, the baler 10 is a square baler for forming bales 42 of a crop, such as hay, straw, or other biomasses.

In the illustrated embodiment, the frame 14 of the baler 10 includes a tow bar 46 extending from the frame 14 and connectable to a towing vehicle (not shown), such as an agricultural tractor or other vehicle. The baler 10 also includes a power takeoff shaft 50 connectable to the towing vehicle to transmit a rotating drive force from the towing vehicle to various components of the baler 10. In other implementations, the baler 10 may have a dedicated power supply and/or prime mover (not shown), such as an engine, motor, battery, fuel cell, etc., for driving the wheels 18 and for driving and/or powering the various components of the baler 10.

Figure 2:
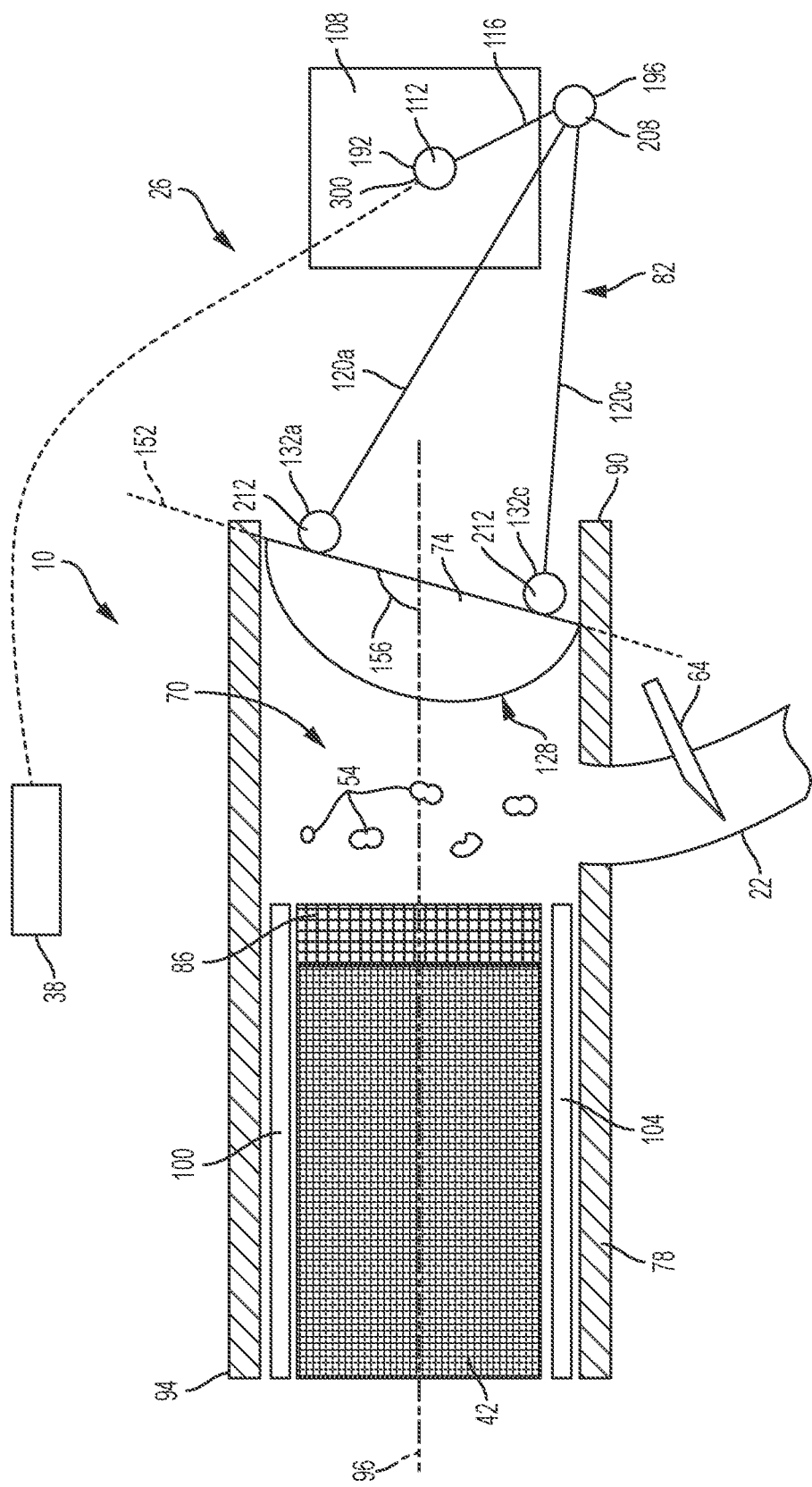
FIG. 2 is a schematic view of the baler of FIG. 1 illustrating a compression assembly, a pickup assembly, and a controller.

As shown in FIGS. 1 and 2, the feed system 22 of the baler 10 is configured to pick up crop material 54 from a support surface 58 and convey it to the compression system 26. In the illustrated implementation, the feed system 22 includes a pickup assembly 62 for receiving the crop material 54 from the support surface 58, and a delivery assembly 64 for directing the collected crop material 54 to the compression system 26. The pickup assembly 62 includes a roller baffle 66 oriented generally perpendicular to the direction of travel for picking up the crop material 54 and placing it in the baler 10.

The delivery assembly 64 of the feed system 22 directs the crop material 54 collected by the pickup assembly 62 to the compression system 26. In particular, the delivery assembly 64 is configured to direct a metered amount of crop material 54 into the baling chamber 70 during every stroke of the plunger 74 (described below). In the illustrated implementation, the delivery assembly 64 is adjustable, permitting different amounts of crop material 54 to be fed into the compression system 26 at a given time (i.e., the "feed rate"). In particular, the feed system 22 is configured to receive one or more signals from the controller 38 causing it to increase or decrease the amount of crop material 54 being delivered to the compression system 26 on a particular stroke.

Illustrated in FIG. 2, the compression system 26 of the baler 10 includes the baling chamber 70 in communication with the feed system 22, a bale case 78 at least partially defining the baling chamber 70, and the plunger assembly 82 positioned at least partially within the baling chamber 70. During operation, a metered amount of crop material or flake 54 is positioned within the baling chamber 70 by the feed system 22 whereby the plunger assembly 82 compresses the crop material 54 against already compacted crop material positioned in the bale case 78, herein referred to as the forming bale 86. The plunger assembly 82 then retracts through the baling chamber 70 as another metered amount of crop material 54 is positioned within the baling chamber 70 by the feed system 22 and the stroke begins again. With each passing stroke, the compression system 26 compresses the newly introduced crop material 54 against the face of the forming bale 86, causing the forming bale 86 to grow into a densely packed cuboid shape within the bale case 78. Once the forming bale 86 achieves the desired size and density, it is bound (e.g., by wire) to form the bale 42. The freshly created bale 42 subsequently becomes a support surface against which the next forming bale 86 may begin to form and the process is repeated. Once a bale 42 is completely formed, the bale 42 is ejected from the rear of the baler 10 for subsequent collection.

The bale case 78 is substantially rectangular in shape having a first open end 90 to receive the plunger 74 therein, and a second open end 94, opposite the first open end 90 positioned proximate the rear of the baler 10. The bale case 78 also defines an axis 96 extending along the length of the bale case 78 proximate its center. During use, the bale case 78 acts as a container, holding the forming bale 86 and one or more completed bales 42 against which the compression system 26 compresses the newly introduced crop material 54 from the feed system 22. While doing so, the bale case 78 applies a compressive or otherwise resistive force against the forming bale 86 and any completed bales 42 to resist motion within the bale case 78 toward the second open end 94. In particular, it is this resistive force that permits the compressive force of the compression system 26 to compact the crop material 54 within the baling chamber 70.

In the illustrated implementation, the bale case 78 includes a top wall 100, a bottom wall 104 opposite the top wall 100, and a pair of side walls (not shown) extending between the top wall 100 and the bottom wall 104. Together, the walls 100, 104 of the bale case 78 produce a substantially square interior cross-section when taken perpendicular to the axis 96.

The walls 100, 104 of the bale case 78 are adjustable with respect to one another to vary the amount of resistive force applied to the forming bale 86 and bales 42. Specifically, the walls 100, 104 of the bale case 78 may move inwardly to apply more pressure to the outside of the forming bale 86 or bale 42 and therefore create a greater resistive force. The walls 100, 104 of the bale case 78 may also move outwardly, away from one another, to reduce the pressure on the outside of the forming bale 86 or bale 42 and therefore create less resistive force. Generally speaking, the greater the resistive force applied to the forming bale 86 and bales 42, the greater the amount of compression that occurs with each stroke of the compression system 26 and the denser the resulting bale 42.

Figure 3:
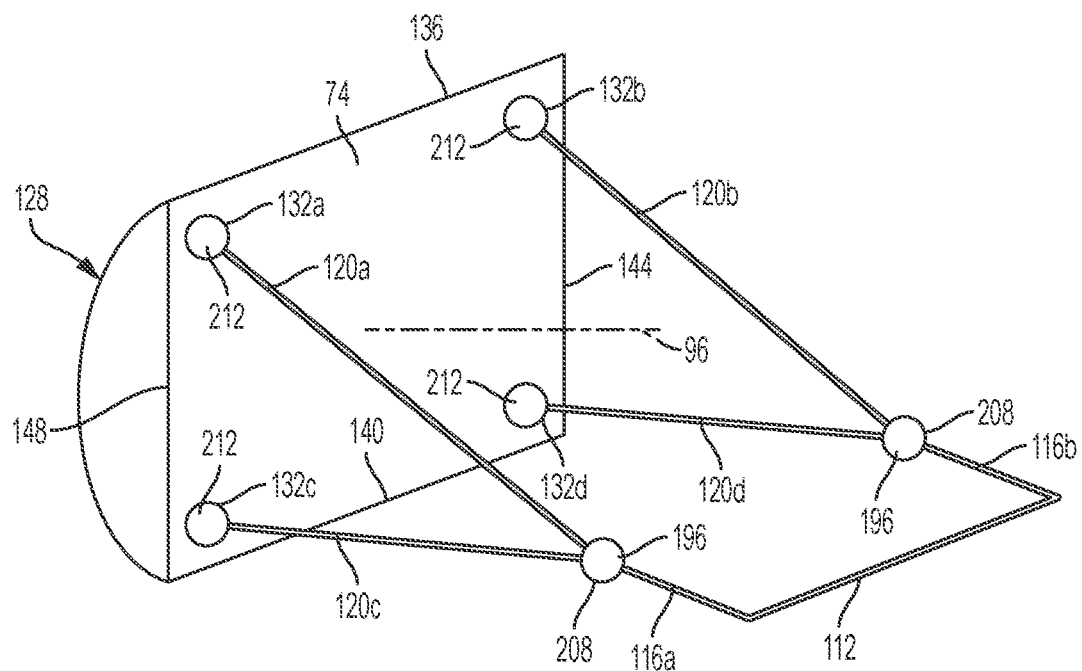
FIG. 3 is a perspective view of the compression assembly of the baler of FIG. 1.
Figure 4:
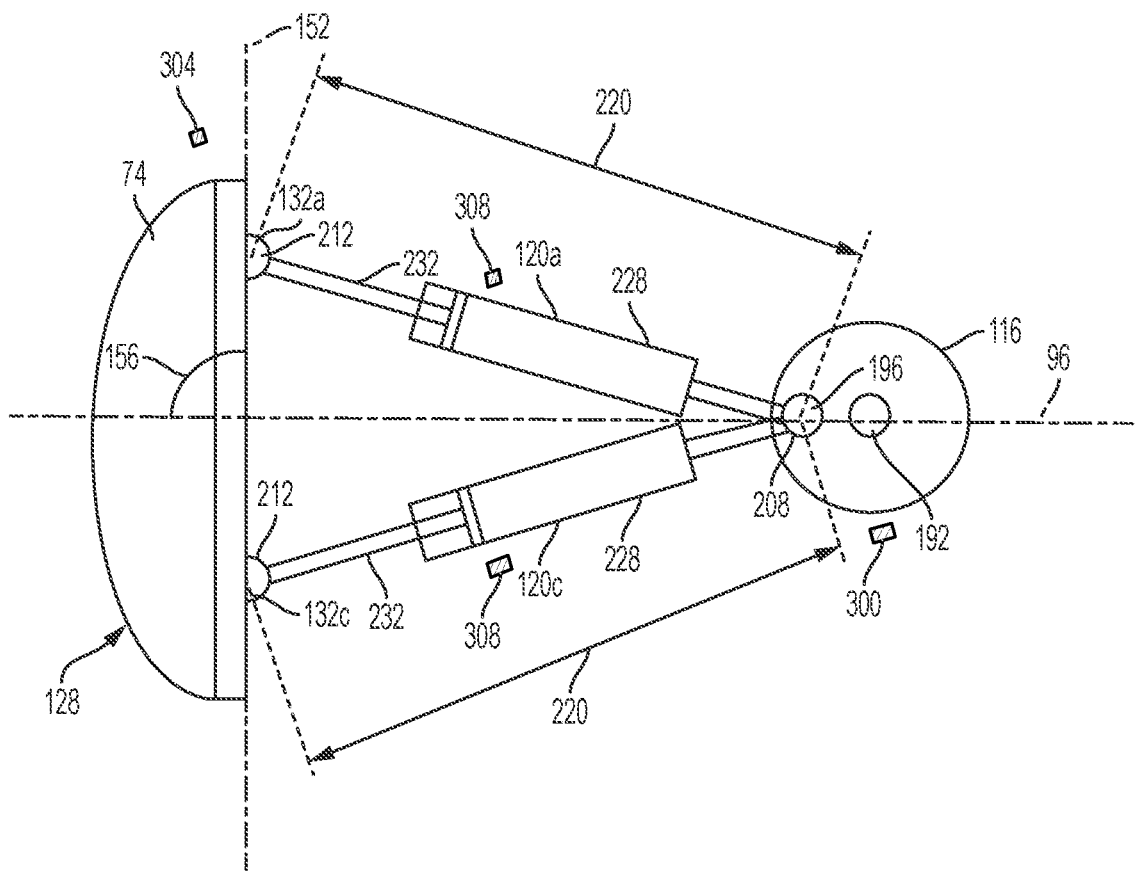
FIG. 4 is a side view of the compression assembly of the baler of FIG. 1.

Referring now to FIGS. 2-4, the plunger assembly 82 of the compression system 26 includes a gearbox 108 having an output shaft 112, a pair of crank arms 116*a*, 116*b* coupled to and rotatable with the output shaft 112, the plunger 74 movable with respect to the baling chamber 70, and a plurality of variable-length connecting rods 120 (120*a*-*d*) each extending between and coupled to both a respective crank arm 116*a,b* and the plunger 74. The plunger assembly 82 also includes a hydraulic system 126 (FIG. 5) to at least partially control the length of the connecting rods 120*a*-*d* (i.e., the connector length 220, described below). In the illustrated embodiment, the gearbox 108 of the plunger assembly 82 receives input from the power takeoff shaft 50, which in turn is driven by an exterior source, such as a tractor and the like (described above). In alternative implementations, the gearbox 108 may be driven by a stand-alone power system, such as an internal combustion engine. The gearbox 108 typically includes a number of gear sets (not shown) to transmit the torque provided by the power takeoff shaft 50 to the output shaft 112 at a given gear ratio. In some implementations, the gearbox 108 may have multiple, interchangeable gear sets to permit the gear ratio provided by the gearbox 108 to be changed according to current operating conditions.

The plunger 74 of the plunger assembly 82 includes a compression surface 128 configured to engage flake 54 positioned within the baling chamber 70, and a plurality of plunger mounting points 132*a*, 132*b*, 132*c*, 132*d* each coupled to a corresponding connecting rod 120. The compression surface 128 of the plunger 74 includes an upper edge 136 positioned proximate the upper wall 100 of the baling chamber 70, a lower edge 140 opposite the upper edge 136 and positioned proximate the bottom wall 104 of the baling chamber 70, a right edge 144 extending between the upper edge 136 and the lower edge 140, and a left edge 148 opposite the right edge 144. (FIG. 3). In the illustrated implementation, the compression surface 128 of the plunger 74 is arcuate or convex in contour having a substantially similar cross-sectional shape along its entire horizontal width (i.e., semi-cylindrical). However, in alternative implementations, the compression surface 128 may include any planar or curvilinear shape (not shown). In still other implementations, the compression surface 128 may change in cross-sectional shape along its width as well as along its height (i.e., hemispherical in shape, and the like).

Figure 6:
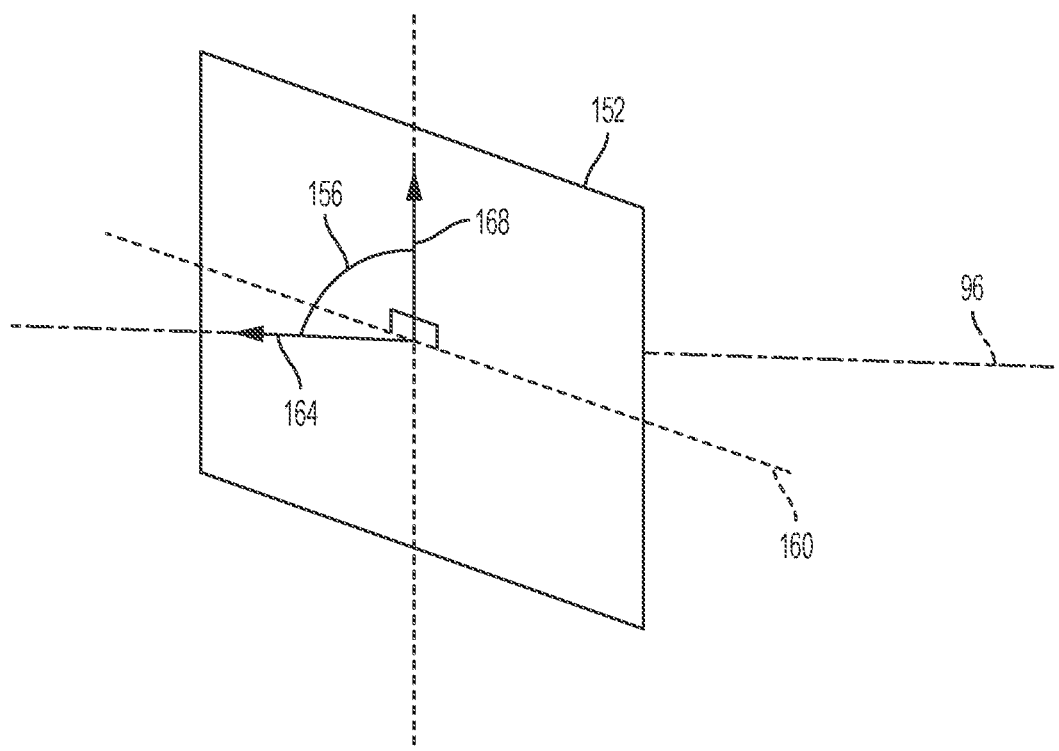
FIG. 6 is a perspective view of the compression plane of the baler of FIG. 1.

The plunger 74 also defines a compression plane 152 extending substantially parallel to a rear face of the plunger 74 and fixed with respect to the compression surface 128. The rear face of the plunger 74 may be defined by the plunger mounting points 132 or rod mounting points 212. During operation, rotational movement of the compression plane 152 about an axis of rotation 160 forms a compression angle 156 with the axis 96 of the baling chamber 70. For the purposes of this application, the compression angle 156 is defined as the angle formed between a first ray 164, originating at the intersection of the compression plane 152 and the axis 96 and extending along the axis 96 in a direction opposite the output shaft 112, and a second ray 168, originating at the intersection of the compression plane 152 and the axis 96 and extending along the compression plane 152 substantially perpendicular to the axis of rotation 160 (see FIG. 6). As such, any angular movement of the compression plane 152 with respect to the axis 96 causes the compression angle 156 to change.

The four plunger mounting points 132a, 132b, 132c, 132d are generally positioned proximate the corners of the compression surface 128 and co-planar the compression plane 152. More specifically, the plunger 74 includes the first plunger mounting point 132a positioned proximate the upper and left edges 136, 148 of the compression surface 128, a second plunger mounting point 132b positioned proximate the upper and right edges 136, 144 of the compression surface 128, a third plunger mounting point 132c positioned proximate the lower and left edges 140, 148 of the compression surface 128, and a fourth plunger mounting point 132d positioned proximate the lower and right edges 140, 144 of the compression surface 128. (FIG. 3). While the illustrated implementation includes four plunger mounting points, it is understood that more or fewer plunger mounting points may be present as necessary to compensate for the number of connecting rods 120 present in the device.

During use, the plunger 74 is positioned within and movable with respect to the baling chamber 70 both linearly along the axis 96 of the baling chamber 70 and angularly with respect to the axis 96. In the present implementation, the angular motion of the plunger 74 may be independently controlled with respect to the linear motion of the plunger 74.

With regards to the linear motion, the plunger 74 translates or moves linearly along the axis 96 of the baling chamber 70 between an extended position (see Position C of FIG. 7), where the plunger 74 is its furthest distance from the output shaft 112, and a retracted position (see Position A of FIG. 7), where the plunger 74 is positioned its closest distance to the output shaft 112. For the purposes of this application, the distance between the retracted position and the extended position is defined as the "plunger stroke length 172." The plunger stroke length 172 is at least partially determined by the crank throw length 176 (described below) and the connector throw length (described below). During the baling process, the plunger stroke length 172 at least partially determines the density of the resulting bale 42. In the illustrated implementation, the plunger stroke length 172 is greater than the crank throw length 176 and greater than the connector throw length.

In addition to moving linearly along the axis 96 of the baling chamber 70, the plunger 74 also moves angularly with respect to the axis 96 of the baling chamber 70 during the baling process. In the illustrated implementation, the plunger 74 rotates about an axis of rotation 160 between a first position (see Position B of FIG. 7), where the compression plane 152 creates a first compression angle 156a, and a second position (see Position D of FIG. 7), where the compression plane 152 creates a second compression angle 156b that is larger than the first compression angle 156a. In the illustrated implementation, the angular difference between the first compression angle 156a and the second compression angle 156b is referred to as the "compression arc range."

While the illustrated implementation includes a convex compression surface 128 being pivoted about a substantially horizontal axis of rotation 160, it is understood that in alternative implementations different shaped compression surfaces may be pivoted about one or more axes of rotation 160, each of which may be in a different relative orientation.

Figure 7:
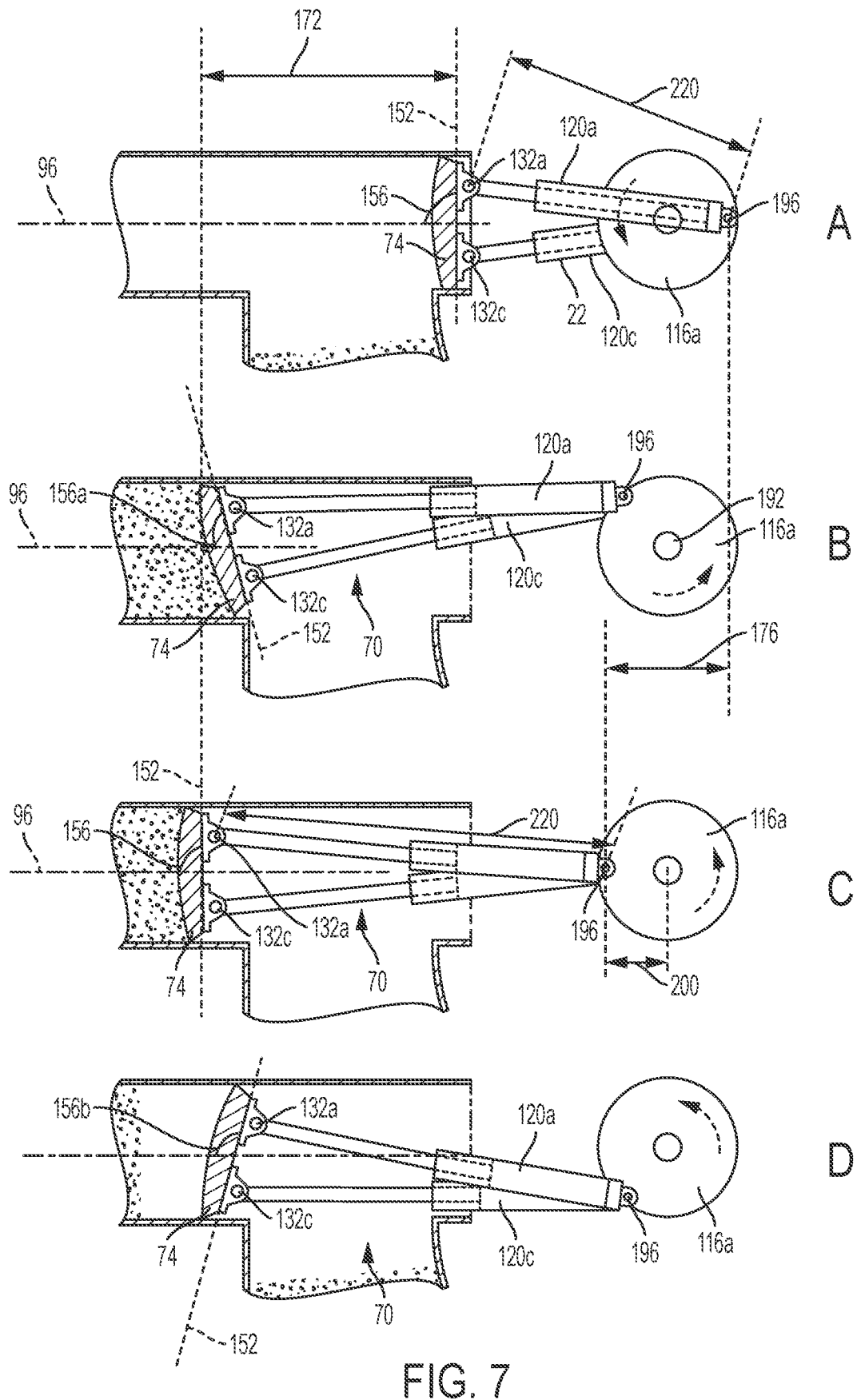
FIG. 7 illustrates various stages of a first stroke profile of the baler of FIG. 1.

Each crank arm 116 of the plunger assembly 82 is substantially elongated in shape and transfers torque between the output shaft 112 and one or more connecting rods 120. Referring to FIG. 7, each crank arm 116 defines a first crank mounting point 192 and a second crank mounting point 196 spaced a crank length 200 from the first crank mounting point 192. When assembled, the first crank mounting point 192 is coupled to and rotates together with the output shaft 112 of the gearbox 108 while the second crank mounting point 196 is coupled to a respective connecting rod 120 and travels around the first crank mounting point 192 in a substantially circular path. In the illustrated implementation, the first crank mounting point 192 includes an aperture formed into the crank arm 116 and sized to at least partially receive a portion of the output shaft 112 therein. In the present application, each crank arm 116 defines a crank throw length 176 equal to twice the respective crank length 200.

Illustrated in FIG. 3, the plunger assembly 82 includes four variable-length connecting rods 120a, 120b, 120c, 120d, each extending between and coupled to a corresponding crank arm 116 and the plunger 74. More specifically, the plunger assembly 82 includes a first connecting rod 120a extending between the first crank arm 116a and the first plunger mounting point 132a, a second connecting rod 120b extending between the second crank arm 116b and the second plunger mounting point 132b, a third connecting rod 120c extending between the first crank arm 116a and the third plunger mounting point 132c, and a fourth connecting rod 120d extending between the second crank arm 116b and the fourth plunger mounting point 132d. During use, the extension and contraction of various combinations of the connecting rods 120, combined with the rotational motion of the crank arms 116 causes the compression surface 128 (and the corresponding compression plane 152) to move angularly with respect to the axis 96 of the baling chamber 70.

For example, increasing the connector length 220 of the first and second connecting rods 120a, 120b with respect to the connector length 220 of the third and fourth connecting rods 120c, 120d forces the compression plane 152 to rotate about a substantially horizontal axis of rotation 160 in a substantially counter-clockwise direction (as viewed in FIG. 7). In contrast, reducing the connector length 220 of the first and second connecting rods 120a, 120b with respect to the connector length 220 of the third and fourth connecting rods 120c, 120d forces the compression plane 152 to rotate about a substantially horizontal axis of rotation 160 in a clockwise direction (as viewed in FIG. 7). In another example, altering the connector length 220 of the first and third connecting rods 120a, 120c with respect to the connector length 220 of the second and fourth connecting rods 120b, 120d forces the compression plane 152 to rotate about a substantially vertical axis of rotation 160. Still further, a combination of the above described motions forces the compression plane 152 to rotate about an axis of rotation 160 that is neither horizontally or vertically oriented. Further still, altering the relative speed of the different extensions and contractions may cause the axis of rotation 160 to change orientation during operation of the device 10.

Still further, increasing or decreasing the connector lengths 220 of all four connecting rods 120a, 120b, 120c, 120d results in the connecting rods creating purely translational movement of the compression plane 152 and, when viewed independent of the crank rotation, does not change the compression angle 156.

Figure 10:
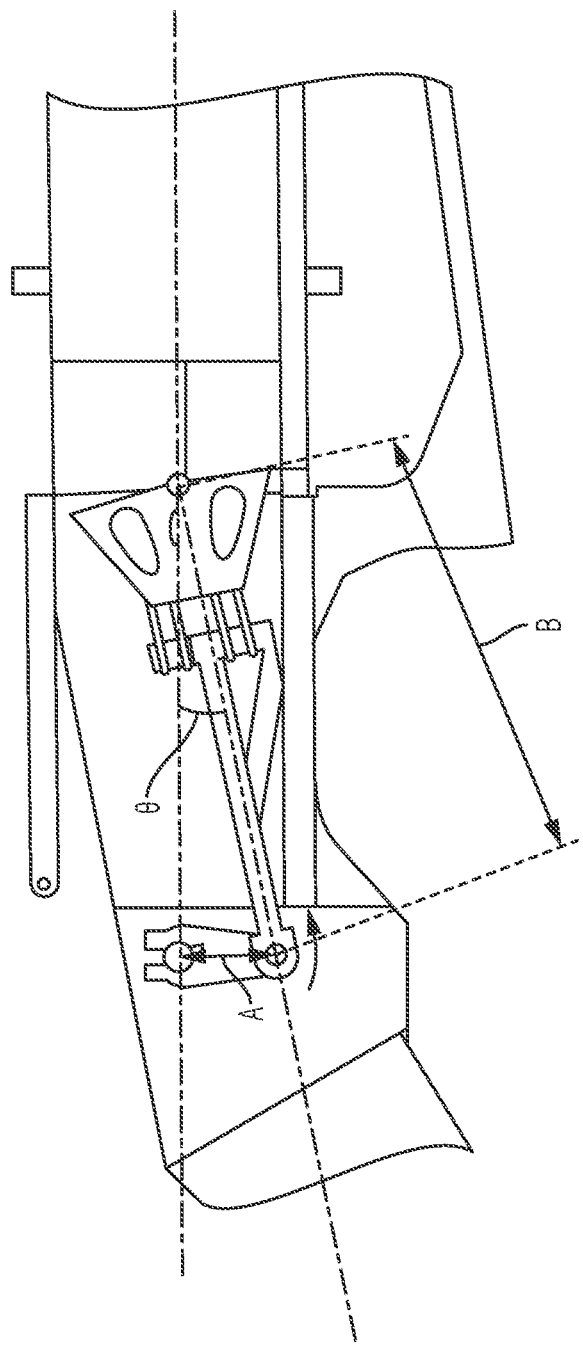
FIG. 10 illustrates a baler with a fixed-length connecting arm.

As described above, the extension and contraction of the connecting rods 120a, 120b, 120c, 120d permits the present implementation to produce a greater compression arc range than a similarly situated baler with a fixed-length connecting arm. More specifically, a baler with a fixed-length connecting rod is limited mechanically by how large of an arc range it can produce as a function of the crank length (A) and the connector length (B; see FIG. 10). For a baler with a fixed-length connecting rod of length B and crank length A, the maximum "fixed arc range" is ±Θ degrees when Θ= $\sin^{-1}(A/B)$.

As illustrated in FIG. 4, each variable-length connecting rod 120 of the plunger assembly 82 is substantially elongated in shape having a first rod mounting point 208, and a second rod mounting point 212 spaced a connector length 220 from the first rod mounting point 208 and movable with respect thereto. More specifically, the first rod mounting point 208 is movable with respect to the second rod mounting point 212 between an extended position (see Position B of FIG. 7), where the connector length 220 is a first length, and a retracted position (see Position A of FIG. 7), where the connector length 220 is a second length, less than the first length. For the purposes of this application, the difference between the first length (i.e., fully extended) and the second length (i.e., fully retracted) is defined as the connector throw length.

Figure 5:
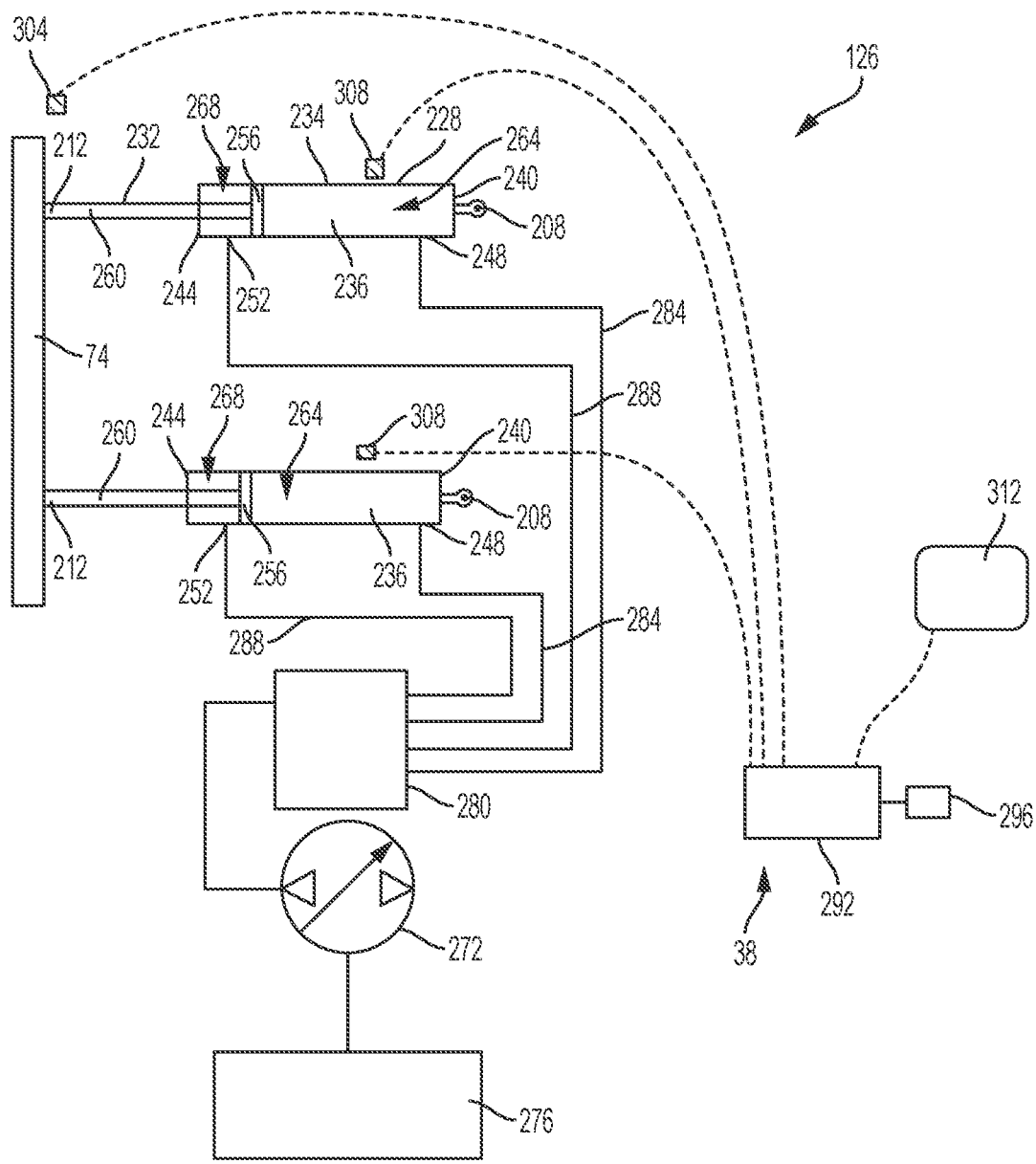
FIG. 5 is a schematic view of the hydraulic assembly of the baler of FIG. 1.

In the illustrated implementation, each connecting rod 120 includes an actuator 224 in the form of a hydraulic cylinder coupled to and extending between the second crank mounting point 196 of the respective crank arm 116 and a respective plunger mounting point 132 of the plunger 74 (described above). Each actuator 224 includes a cylinder portion 228 and a piston portion 232 moveable with respect to the cylinder portion 228. (FIG. 5). While the illustrated actuator 224 is a hydraulic cylinder, in alternative implementations the actuator 224 may include a mechanical or pneumatic actuator (not shown).

With reference to FIG. 5, the cylinder portion 228 of each actuator 224 is substantially cylindrical in shape including an annular outer wall 234 that at least partially defines an elongated cavity 236 therein. The cavity 236, in turn, includes a first end 240 proximate the first rod mounting point 208, and a second end 244 opposite the first end 240. The cylinder portion 228 also includes a first fluid port 248 in fluid communication with the cavity 236 and positioned proximate the first end 240 thereof. The cylinder portion 228 also includes a second fluid port 252 in fluid communication with the cavity 236 and positioned proximate the second end 244 thereof.

As shown in FIG. 5, the piston portion 232 of the actuator 224 includes a piston 256 sized to be positioned within and movable axially along the length of the cavity 236 of the cylinder portion 228 between the first end 240 and the second end 244. The piston portion 232 also includes a rod 260 extending axially from the piston 256, beyond the second end 244 of the cavity 236, to produce the second rod mounting point 212. When the actuator 224 is assembled, the piston 256 of the piston portion 232 contacts and forms a seal with the annular outer wall 234 of the cavity 236 thereby dividing the cavity 236 into a first volume 264 in fluid communication with the first fluid port 248, and a second volume 268 in fluid communication with the second fluid port 252.

During use, each actuator 224 receives hydraulic fluid from the hydraulic system 126 causing the piston portion 232 and the second rod mounting point 212 to move with respect to the cylinder portion 228 and the first rod mounting point 208. More specifically, when the actuator 224 receives hydraulic fluid via the first fluid port 248, fluid flows into the first volume 264 of the cavity 236 causing the first volume 264 to increase in size while fluid is forced out of the second volume 268 causing the second volume 268 to decrease in size. The resulting fluid flow forces the piston 256 toward the second end 244 of the cavity 236 (see Positions A-C of FIG. 7) causing the connector length 220 to increase. In contrast, when the actuator 224 receives hydraulic fluid via the second fluid port 252, fluid flows into the second volume 268 of the cavity 236 causing the second volume 268 to increase in size while fluid is forced out of the first volume 264 causing the first volume 264 to decrease in size. The resulting fluid flow forces the piston 256 toward the first end 240 of the cavity 236 and causes the connector length 220 to decrease.

While the present implementation illustrates the actuator 224 having the cylinder portion 228 coupled to a respective crank arm 116 and the piston portion 232 coupled to the plunger 74, it is understood that the actuator 224 may be installed in the opposite orientation (i.e., with the cylinder portion 228 coupled to the plunger 74 and the piston portion 232 coupled to the crank arm 116). In still other implementations, each connecting rod 120 may include linkages, tracks, pulleys, cables, and gearsets, in addition to the actuator 224 (not shown).

With continued reference to FIG. 5, the hydraulic system 126 of the plunger assembly 82 includes a pump 272 and a reservoir 276 in fluid communication with the pump 272. The hydraulic system 126 also includes a manifold 280 in fluid communication with the pump 272 and configured to direct fluid flow. More specifically, the manifold 280 includes a plurality of valves (not shown) able to direct fluid discharged by the pump 272 to one or more of the connecting rods 120. In the illustrated implementation, the pump 272 is a variable displacement pump able to adjust the rate and pressure at which fluid is discharged. Although not shown, the hydraulic system 126 may also include one or more safety valves (not shown) to direct excess fluid to the reservoir 276. Furthermore, while the present hydraulic system 126 includes a single pump configured to selectively provide hydraulic fluid to each of the individual connecting rods 120, in alternative implementations, the hydraulic system may include a plurality of pumps, each configured to provide hydraulic fluid to a select group of one or more connecting rods 120.

For each connecting rod 120, the hydraulic system 126 includes a first feed line 284 extending between and in fluid communication with the manifold 280 and the first fluid port 248 of a respective connecting rod 120, and a second feed line 288 extending between and in fluid communication with the manifold 280 and the second fluid port 252 of the same connecting rod 120. The manifold 280 also includes one or more valves (not shown) to direct the output of the pump 272 through either the first feed line 284 and/or the second feed line 288. As such, the hydraulic system 126 is able to independently extend and contract any combination of connecting rods 120 during the baling process.

Illustrated in FIGS. 2 and 5, the controller 38 of the baler 10 includes a processor 292, a memory unit 296 in operable communication with the processor 292, one or more sensors 300, 304, 308 sending and receiving signals from the processor 292, and a user input 312 in operable communication with the processor 292. The processor 292 is also in operable communication with various elements of the hydraulic system 126 including, but not limited to, the pump 272 and the manifold 280, or more precisely the valves associated with the manifold 280. During use, the processor 292 receives signals from the one or more sensors 300, 304, 308, combines that information with one or more predetermined control algorithms, and outputs signals to control the motion and compression angles 156 of the plunger 74 through the actuators 224.

In particular, the baler 10 includes a crank arm position sensor 300, a plunger position sensor 304, and a plurality of connector length sensors 308. The sensors 300, 304, 308 may be present individually, in plurality, or in combination. Although not illustrated, the controller 38 may also include additional sensors such as, but not limited to, a connector length sensor (not shown).

The crank arm position sensor 300 includes a position sensor mounted to a respective crank arm 116 of the plunger assembly 82 and configured to measure the relative rotational position of the crank arm 116 with respect to the gearbox 108 or "crank position." The crank arm position sensor 300 may include a sensor mounted directly to the crank arm 116, or a sensor mounted on the output shaft 112. Such sensors may include Hall Effect sensors, variable resistance sensors, optical sensors, and the like. For the purposes of this application, the crank position is defined as an axis extending radially outwardly from the first crank mounting point 192 through the second crank mounting point 196. As such, the 3 o'clock crank position (Position A of FIG. 7) generally corresponds with the retracted position of the plunger 74 while the 9 o'clock crank position (Position C of FIG. 7) generally corresponds with the extended position of the plunger 74.

The plunger position sensor 304 determines the relative position of the plunger 74 with respect to the baling chamber 70. The plunger position sensor 304 may include a sensor mounted directly on the plunger 74, a sensor mounted to the baling chamber 70, or a sensor mounted to the output shaft 112 of the gearbox 108. Such sensors may include Hall Effect sensors, variable resistance sensors, optical sensors, and the like.

Each one of the plurality of connector length sensors 308 determines the connector length 220 of a respective connecting rod 120. Each connector length sensor 308 may include a sensor mounted directly on the respective connecting rod 120. Such sensors may include an optical sensor, a variable resistance sensor, and the like.

Figure 8:
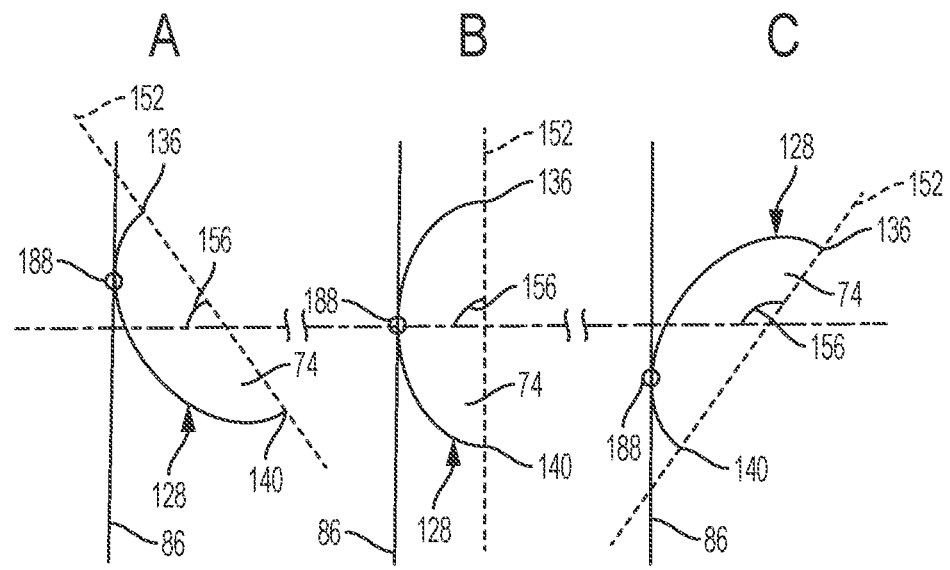
FIG. 8 illustrates the compression surface of the baler of FIG. 1 in different vertical compression angles.

During the baling process, the plunger 74 is configured to compress crop material 54 located within the baling chamber 70 and positioned between the compression surface 128 and the forming bale 86. In particular, the plunger 74 begins each stroke from the retracted position (see Position A of FIG. 7), with the compression plane 152 substantially normal to the axis 96 of the baling chamber 70, and with a metered amount of crop material or flake 54 positioned within the baling chamber 70. The plunger 74 then begins moving along the axis 96 toward the extended position while simultaneously rotating in a counter-clockwise direction (with respect to FIG. 7) toward the first position (i.e., rotating about a substantially horizontal axis of rotation 1 and reducing the compression angle 156; see FIG. 7). As the plunger 74 approaches the first position (Position B of FIG. 7), the angled compression surface 128 captures the newly introduced crop material 54 between itself and the forming bale 86 creating a "perpendicular contact point 188" on the compression surface 128 (see Position A of FIG. 8). In the present application, the perpendicular contact point 188 is the area or region of the compression surface 128 that is both in contact with the forming bale 86 and perpendicular to the axis 96 of the baling chamber 70. In the present implementation, the perpendicular contact point 188 is a narrow band extending horizontally across the compression surface 128.

After the crop material 54 has been captured, the plunger 74 continues to move toward the extended position thereby compressing the crop material 54 into the forming bale 86. During the compression process, the plunger 74 (and compression plane 152) beings to rotate about the axis of rotation 160 in a clockwise direction from the first position (see Position B of FIG. 7) towards the second position (see Position D of FIG. 7). While doing so, the perpendicular contact point 188 begins to travel down the compression surface 128 from a position closer to the upper edge 136 (i.e., when the compression plane 152 is proximate the first position; see Position A of FIG. 8) to a position closer to the lower edge 140 (i.e., when the compression plane 152 is proximate the second position; see Positions C of FIG. 8). This rotational movement causes the compression surface 128 to progressively compress the captured crop material 54 from the top down (i.e., from proximate the upper edge 136 to proximate the lower edge 140). More specifically, the compression surface 128 only compresses the crop material 54 positioned proximate the perpendicular contact point 188 at any one time. As such, the compressive force required to produce a desired bale density is reduced when compared to a similarly sized non-rotational compressive surface. Stated differently, while planar or non-rotating plungers must compress the entire surface area of the compression surface at once (requiring the ability to create a large, singular force), the present invention applies a smaller compressive force over a larger range of motion.

After undergoing the compression process, the plunger 74 returns back to the retracted position (see Position A of FIG. 7) eventually disengaging from the forming bale 86 and moving away from the bale case 78. Once the plunger 74 has returned to its initial retracted position, the feed system 22 may position a second metered amount of crop material 54 within the baling chamber 70 and the stroke begins anew.

While undergoing the general baling process described above, the processor 292 of the baler 10 monitors the motion of the plunger 74 and the crank arm 116 and outputs signals to the hydraulic system 126 to control the extension and contraction of the connecting rods 120 to produce the desired plunger motion or "stroke profile." More specifically, the processor 292 outputs signals to the pump 272 and manifold 280 of the hydraulic system 126 to direct the flow of hydraulic fluid toward either the first fluid port 248 or the second fluid port 252 of each individual connecting rod 120. As the plunger 74 moves along its stroke path, the processor 292 receives a stream of information in the form of signals from the sensors 300, 304, 308 positioned throughout the baler 10. In particular, the processor 292 may receive data including, but not limited to, the position of the plunger 74, the rotational position of the crank arm 116 (i.e., the crank position), the connector length 220 of each individual connecting rod 120, the pressure of the hydraulic fluid within the hydraulic system 126, the compression angles 156, 164 of the compression plane 152, and the like. The processor 292 then compiles the raw information received from the sensors 300, 304, 308 and processes it to determine the desired connector length 220 for each individual connecting arm 120 as the stroke progresses.

Each stroke profile may include various quantities and combinations of different stages or steps to produce the desired plunger 74 movement. For example, and referring to FIG. 8, each stroke profile may include an extension stage 322, a first rotation stage 326, a second rotation stage 330, a third rotation stage 334, a fourth rotation stage 338, and a retraction stage 342. In the illustrated implementation, the timing, frequency, and duration of the various stages are generally dependent upon the relative location of the crank arm 116 or "crank position." However, in alternative implementations, the timing, frequency, and duration of the various stages may also be dependent upon the position of the plunger 74, the forces exerted on the plunger 74, the connector length 220, the hydraulic fluid pressure levels, and the like.

Figure 9:
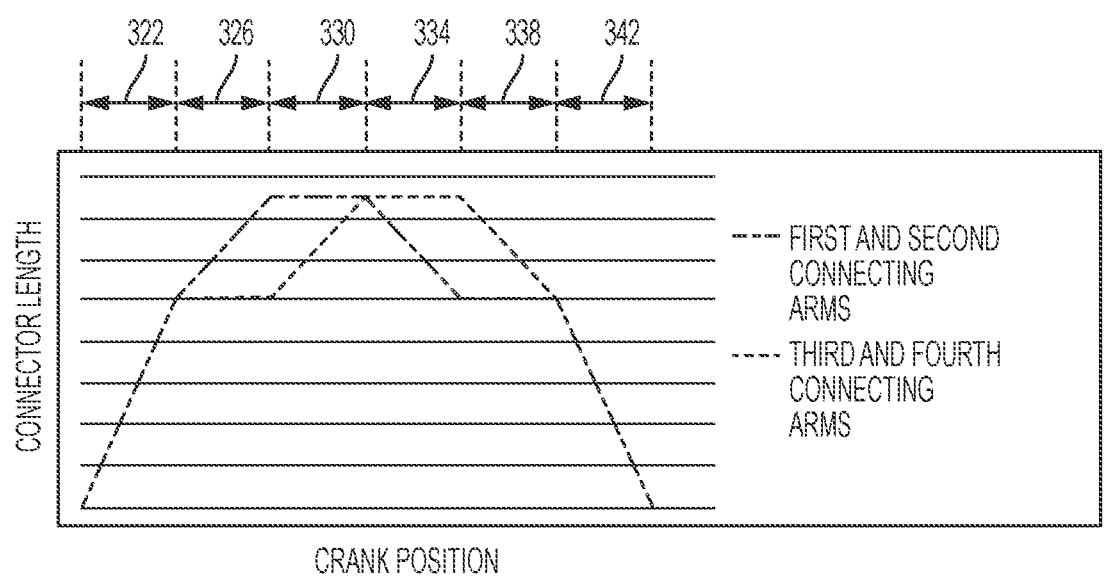
FIG. 9 is a chart correlating the connecting rod lengths for a given crank position with respect to the first stroke profile.

As illustrated in FIGS. 7 and 9, a first stroke profile begins with the crank arm 116 in the 3 o'clock crank position, the plunger 74 in the retracted position, and the compression plane 152 substantially normal to the axis 96. During the duration of the stroke, both crank arms 116a,b travel in a counter-clockwise direction at a relatively constant rotational speed. In alternative implementations, the rotational speed and direction of an individual crank arm 116a,b may be adjusted as necessary.

During the first stroke profile, the stroke begins with the extension stage 322 and with the crank arm 116 in the 3 o'clock position. During the extension stage 322, the processor 292 sends signals to the hydraulic system 126 instructing the manifold 280 and pump 272 to direct hydraulic fluid via the first feed lines 284 to the first fluid ports 248 of all four connecting rods 120a, 120b. 120c, 120d. As described above, this causes the connector length 220 of each connecting rod 120a, 120b. 120c, 120d to increase. The resulting change in connector lengths 220 causes the distance between the second crank mounting point 196 and the plunger 74 to increase but does not contribute to any rotation of the compression plane 152 with respect to the axis 96 of the baling chamber 70. The connector lengths 220 of all four connecting rods 120a, 120b. 120c, 120d continue to increase throughout the duration of the extension stage 322 (FIG. 9) at a speed generally dictated by the rate at which the pump 272 and manifold 280 provide fluid to the first volumes 264. Furthermore, because the crank arm 116 is traveling from the 3 o'clock position toward the 2 o'clock position, the rotation of the crank arm 116 causes the plunger 74 to translate toward the extended position while also contributing to the decrease in the vertical compression angle 156 of the compression plane 152.

In the illustrated implementation, the extension stage 322 continues until the crank arm 116 reaches the 2 o'clock position (FIG. 9). In alternative implementations, the extension stage 322 lasts until the crank arm 116 reaches between approximately the 2 o'clock position and approximately the 12 o'clock position. In still other implementations, the processor 292 may remain in the extension stage 322 until the connector length 220 of each connecting rod 120a, 120b. 120c, 120d reaches a predetermined value. In still other implementations, the processor 292 may remain in the extension stage until the plunger 74 reaches a predetermined location. In still other implementations, the processor 292 may remain in the extension stage 322 until the plunger 74 reaches a predetermined vertical compression angle 156. In still other implementations, the duration of the extension stage 322 may take into consideration a combination of the factors listed above.

After the extension stage 322, the processor 292 enters the first rotation stage 326 (FIG. 9). During the first rotation stage 326, the processor 292 sends signals to the hydraulic system 126 instructing the manifold 280 to direct hydraulic fluid via the first feed lines 284 to the first fluid ports 248 of only the first and second connecting rods 120a, 120b. The processor 292 also sends signals to the manifold 280 stopping the flow of fluid to the third and fourth connecting rods 120c, 120d. The resulting distribution of hydraulic fluid causes the connector lengths 220 of the first and second connecting rods 120a, 120b to increase while the connector lengths 220 of the third and fourth connecting rods 120c, 120d remains constant. The resulting change in connector length 220 causes the vertical compression angle 156 of the compression plane 152 to decrease. The connector lengths 220 of the first and second connecting rods 120a, 120b continue to increase throughout the duration of the first rotation stage 326 (FIG. 9) at a speed generally dictated by the rate at which the pump 272 is providing fluid to the first volumes 264. As such, the vertical compression angle 156 continues to decrease. Because the crank arm 116 is traveling from the 2 o'clock position toward the 12 o'clock position, the rotation of the crank arm 116 causes the plunger 74 to translate toward the extended position while also contributing to the increase in the vertical compression angle 156 of the compression plane 152.

In the illustrated implementation, the first rotation stage 326 continues until the crank arm 116 reaches the 12 o'clock position. In alternative implementations, the duration of the first rotation stage 326 may take into consideration a combination of the factors such as those described above (i.e., with respect to the extension stage 322).

After the first rotation stage 326, the processor 292 enters the second rotation stage 330 (FIG. 9). During the second rotation stage 330, the processor 292 sends signals to the hydraulic system 126 instructing the manifold 280 and pump 272 to direct hydraulic fluid via the first feed lines 284 to the first fluid ports 248 of only the third and fourth connecting rods 120c, 120d. The processor 292 also sends signals to the hydraulic system 126 instructing the manifold 280 to stop fluid flow to the first and second connecting rods 120a, 120b. The resulting fluid flow causes the connector lengths 220 of the third and fourth connecting rods 120c, 120d to increase while the connector lengths 220 of the first and second connecting rods 120a, 120b remain constant. The resulting changes in connector lengths 220 cause the vertical compression angle 156 of the compression plane 152 to increase. The connector lengths 220 of the third and fourth connecting rods 120c, 120d continue to increase throughout the duration of the second rotation stage 338 (FIG. 9) at a speed generally dictated by the rate at which the pump 272 and manifold 280 provides fluid to the first volumes 264. As such, the vertical compression angle 156 continues to increase. Because the crank arm 116 is traveling from the 12 o'clock position toward the 9 o'clock position, the rotation of the crank arm 116 causes the plunger 74 to travel toward the extended position while also contributing to the increase in the vertical compression angle 156 of the compression plane 152.

In the illustrated implementation, the second rotation stage 330 continues until the crank arm 116 reaches the 9 o'clock position (see Position C of FIG. 7). In alternative implementations, the second rotation stage 330 may take into consideration a combination of factors such as those described above (i.e., with respect to the extension stage 322).

After the second rotation stage 330, the processor 292 enters the third rotation stage 334 (FIG. 9). During the third rotation stage 334, the processor 292 sends signals to the hydraulic system 126 instructing the manifold 280 and pump 272 to direct hydraulic fluid via the second feed lines 288 to the second fluid ports 252 of only the first and second connecting rods 120a, 120b. The processor 292 also sends signals to the hydraulic system 126 instructing the manifold 280 to stop fluid flow to the third and fourth connecting rods 120c, 120d. The resulting fluid flow causes the connector lengths 220 of the first and second connecting rods 120a, 120b to decrease while the connector lengths 220 of the third and fourth connecting rods 120c, 120d remain constant. The resulting change in connector lengths cause the vertical compression angle 156 to increase. The connector lengths 220 of the first and second connecting rods 120a, 120b continue to decrease throughout the duration of the third rotation stage 334 (FIG. 9) at a speed generally dictated by the rate at which the pump 272 provides fluid to the second volumes 268 of the first and second connecting rods 120a, 120b. As such, the vertical compression angle 156 continues to increase. Because the crank arm 116 travels from 9 o'clock position toward the 6 o'clock position, the rotation of the crank arm 116 causes the plunger 74 to travel away from the extended position (i.e., toward the retracted position) and contributes to the increase in the vertical compression angle 156 of the compression plane 152.

In the illustrated implementation, the third rotation stage 334 continues until the crank arm 116 reaches the 6 o'clock position. In other implementations, the duration of the third rotation stage 334 may take into consideration a combination of different factors such as those described above (i.e., with respect to the extension stage 322).

After the third rotation stage 334, the processor 292 enters the fourth rotation stage 338 (FIG. 9). During the fourth rotation stage 338, the processor 292 sends signals to the hydraulic system 126 instructing the manifold 280 and the pump 272 to direct hydraulic fluid via the second feed lines 288 to the second fluid ports 252 of only the third and fourth connecting rods 120c, 120d. The processor 292 also sends signals to the hydraulic system 126 instructing the manifold 280 to stop fluid flow to the first and second connecting rods 120a, 120b. The resulting fluid flow causes the connector lengths 220 of the third and fourth connecting rods 120c, 120d to decrease while the connector length 220 of the first and second connecting rods 120a, 120b remain constant. The resulting change in connector lengths 220 causes the vertical compression angle 156 to decrease. The connector lengths 220 of the third and fourth connecting rods 120c, 120d continue to decrease throughout the duration of the fourth rotation stage 338 (FIG. 9) at a speed generally dictated by the rate at which the pump 272 is providing fluid to the second volumes 268. As such, the compression angle 156 continues to decrease. Because the crank arm 116 is traveling from the 6 o'clock position toward the 4 o'clock position, the rotation of the crank arm 116 causes the plunger 74 to travel toward the retracted position while also contributes to the decrease in the vertical compression angle 156 of the compression plane 152.

In the illustrated implementation, the fourth rotation stage 338 continues until the crank arm 116 reaches the 4 o'clock position (Position A of FIG. 7). In alternative implementations, the duration of the fourth rotation stage 338 may take into consideration a combination of the factors such as those described above (i.e., with respect to the extension stage 322).

After the fourth rotation stage 338, the processor 292 enters the retraction stage 342. During the retraction stage 342, the processor 292 sends signals to the hydraulic system 126 instructing the manifold 280 and pump 272 to direct hydraulic fluid via the second feed lines 288 to the second fluid ports 252 of all four connecting rods 120a, 120b. 120c, 120d. As described above, the resulting fluid flow causes the connector lengths 220 of each connecting rod 120a, 120b. 120c, 120d to decrease. The resulting change in connector lengths 220 causes the distance between the second crank mounting point 196 and the plunger 74 to decrease but does not contribute to any rotation of the compression plane 152 with respect to the axis 96 of the baling chamber 70. The connector lengths 220 of all four connecting rods 120a, 120b. 120c, 120d continue to decrease throughout the duration of the retraction stage 342 (FIG. 9) at a speed generally dictated by the rate at which the pump 272 is providing fluid to the second volumes 268. Furthermore, because the crank arm 116 is traveling from the 6 o'clock position toward the 3 o'clock position, the rotation of the crank arm 116 causes the plunger 74 to translate toward the retracted position while also contributing to the increase in the vertical compression angle 156 of the compression plane 152.

Once the crank arm 116 has returned to the 3 o'clock position, the processor 292 may enter the extension stage 322 and the cycle begins anew.

While the first stroke profile teaches the use of the above described stages, it is understood that more or fewer stages may be included during the baling process. For example, in a second stroke profile (FIG. 9a), the processor 292 may combine the extension stage 322 with the first rotation stage 326 to create a first combined stage 400. During the first combined stage 400, the processor 292 causes the connector lengths 220 of the first and second connecting rods 120a, 120b to increasing at a first rate while the connector lengths 220 of the third and fourth connecting rods 120c, 120d increase at a second rate slower than the first rate. The resulting stage 400 permits both the translational movement of the plunger 74 due to the overall increase of connector lengths 220 of all four connecting rods 120a, 120b, 120c, 120d while also contributing to the decrease in vertical compression angle 156 by causing the first and second connecting rods 120a, 120b to extend longer than the third and fourth connecting rods 120c, 120d.

Figure 9A:
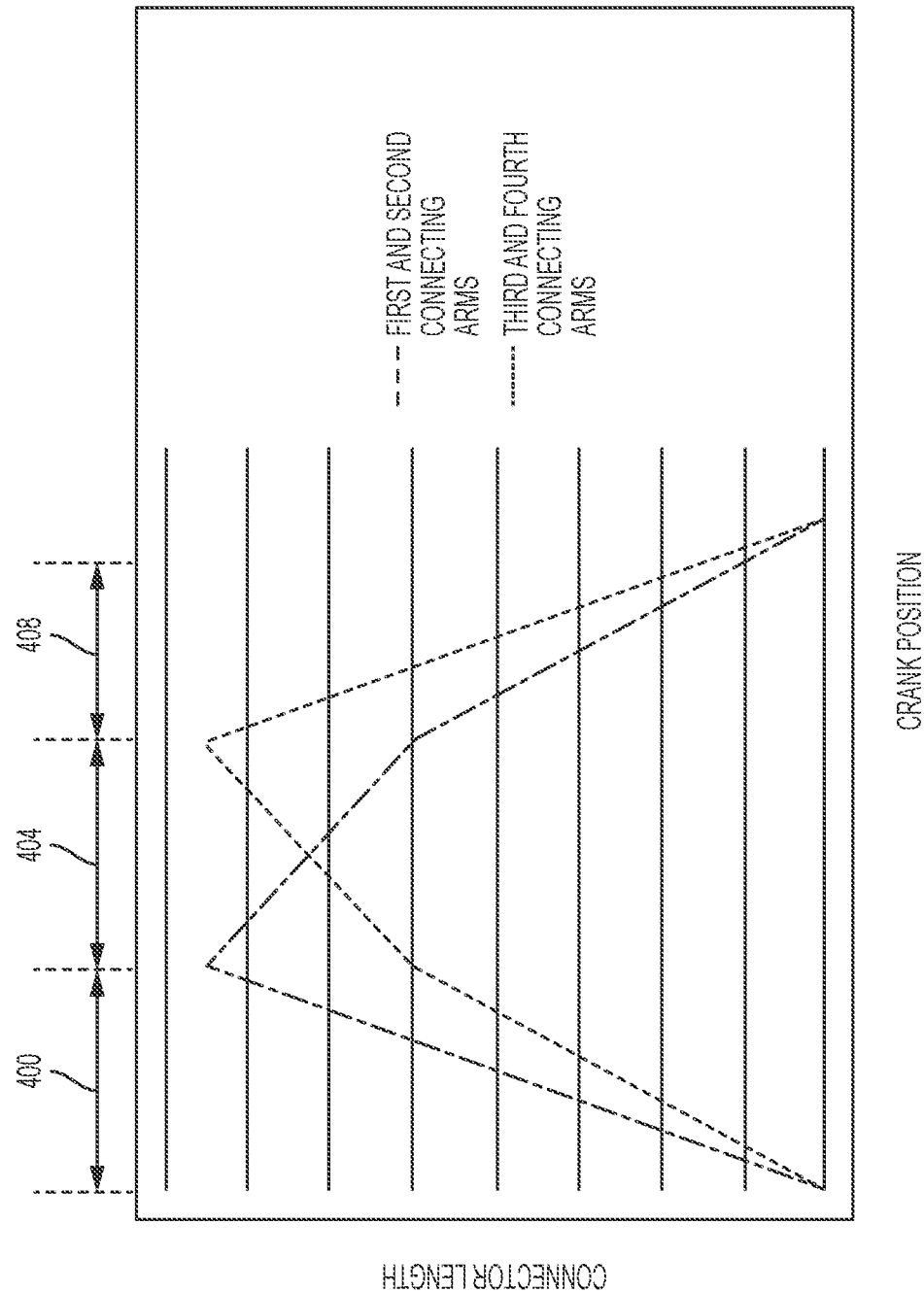
FIG. 9A is a chart correlating the connecting rod lengths for a given crank position with respect to a second stroke profile.

After the first combined stage 400, the processor 292 may then combine the second and third rotation stages 330, 334 into a second combined stage 404. (FIG. 9a). During the second combined stage 404 the processor 292 increases the connector lengths 220 of the third and fourth connecting rods 120c, 120d at a first rate while simultaneously decreasing the connector lengths 220 of the first and second connecting rods 120a, 120b at the same first rate. The above described extensions and contractions result in the compression plane 152 rotating in a clockwise direction from the first position to the second position (described above).

After the second combined stage 404, the processor 292 may also combine the fourth rotation stage 338 and the retraction stage 342 into a third combined stage 408. (FIG. 9a). During the third combined stage 408 the processor 292 decreases the connector lengths 220 of the first and second connecting rods 120a, 120b at a first rate while decreasing the connector lengths 220 of the third and fourth connecting rods 120c, 120d at a second rate that is greater than the first rate. Similar to the first combined stage 400, the resulting third combined stage 408 permits both the translational movement of the plunger 74 due to the overall decrease in connector lengths 220 of all four connecting rods 120*a*, 120*b*, 120*c*, 120*d* while also contributing to the increase in vertical compression angle 156 by allowing the third and fourth connecting rods 120*c*, 120*d* to shorten by a larger distance than the first and second connecting rods 120*a*, 120*b*.

In still another alternative implementation, the processor 292 may only utilize the connecting rods 120*a*, 120*b*, 120*c*, 120*d* for purely translational motion, relying on the rotation of the crank arm 116 to create the necessary angular movement of the compression plane 152. In such implementations, the layout of the connecting rods 120*a*, 120*b*, 120*c*, 120*d* allow the distance between the plunger 74 and the second crank mounting point 196 to be altered while simultaneously fixing the rotational movement of the plunger 74 to the crank arm 116. As such, any changes to the compression angle 156 will be purely the result of the crank arm's rotation during the baling process.

Various features of the disclosure are set forth in the following claims.

What is claimed is:

1. A baler comprising:
a frame;
a feed system coupled to the frame;
a baling chamber defining an axis therethrough;
a crank arm;
a plunger being at least partially positioned within and movable with respect to the baling chamber, the plunger having a compression surface and defining a compression plane fixed with respect to the compression surface, wherein the compression plane defines a compression angle with respect to the axis of the baling chamber; at least one connecting rod extending between and coupled to both the crank arm and the plunger; and
wherein the compression angle of the compression surface is adjustable to a different angle by the at least one connecting rod, independently of the rotation of the crank arm.

2. The baler of claim 1, wherein the compression surface includes an upper edge and a lower edge opposite the upper edge; and the at least one connecting rod includes: a first connecting rod coupled to the plunger closer to the upper edge than to the lower edge, and a second connecting rod coupled to the plunger closer to the lower edge than to the upper edge.

3. The baler of claim 2, wherein the first connecting rod defines a first connector length, wherein the second connecting rod defines a second connector length, and wherein the first connector length is adjustable independently of the second connector length.

4. The baler of claim 2, wherein the first connecting rod defines a first connector length, and wherein the second connecting rod defines a second connector length, and wherein changing the first connector length with respect to the second connector length causes the compression angle to change.

5. The baler of claim 1, wherein compression plane is movable angularly with respect to the axis of the baling chamber over a compression arc range, and wherein the compression arc range is greater than the fixed maximum arc range.

6. The baler of claim 1, wherein the compression surface is convex in contour.

7. A baler comprising:
a frame;
a feed system coupled to the frame;
a baling chamber defining an axis therethrough;
a crank arm defining a crank throw length;
a plunger positioned within and moveable with respect to the baling chamber, the plunger having a compression surface and defining a compression plane fixed with respect to the compression surface, wherein the compression plane defines a compression angle with respect to the axis of the baling chamber, wherein the compression angle is adjustable, and wherein the plunger defines a plunger stroke length; and
wherein the plunger is configured to produce more than one compression angle for a given crank arm position by at least one connecting rod, and wherein the compression angles are different from one another.

8. The baler of claim 7, wherein the at least one connecting rod includes a first connecting rod extending between and coupled to both the crank arm and the plunger.

9. The baler of claim 8, wherein the first connecting rod defines a connector length, and wherein the connector length is adjustable.

10. The baler of claim 8, wherein the at least one connecting rod includes a second connecting rod extending between and coupled to both the crank arm and the plunger.

11. The baler of claim 10, wherein the first connecting rod defines a first connector length, and wherein the second connecting rod defines a second connector length, and wherein adjusting the first connector length with respect to the second connector length causes the compression angle to change.

12. The baler of claim 8, further comprising a hydraulic system in fluid communication with the first connecting rod.

13. The baler of claim 7, wherein the compression angle is adjustable over a compression arc range, and wherein the compression arc range is greater than the fixed maximum arc range.

14. A baler comprising:
a frame;
a feed system coupled to the frame;
a baling chamber defining an axis therethrough;
a crank arm having a first crank mounting point;
a plunger positioned within and moveable with respect to the baling chamber, the plunger having a compression surface and defining a compression plane fixed with respect to the compression surface, wherein the compression plane defines a compression angle with respect to the axis of the baling chamber, and wherein the compression angle is adjustable; and
a first connecting arm extending between and coupled to the plunger closer to a top edge of the compression surface than to a bottom edge of the compression surface and the crank arm at the first crank mounting point; and
a second connecting arm extending between and coupled to the plunger closer to the bottom edge of the compression surface than to the top edge of the compression surface and the crank arm at the first crank mounting point; and
wherein the first connecting arm defines a first connector length, wherein the second connecting arm defines a second connector length, and wherein the first connector length is adjustable independent of the second connector length.

15. The baler of claim 14, wherein adjusting the first connector length with respect to the second connector length causes the compression angle to change.

16. The baler of claim 14, wherein the first connecting arm and the second connecting arm are in fluid communication with a hydraulic system.

17. The baler of claim 16, wherein the hydraulic system includes a manifold configured to selectively provide fluid to the first connecting arm and the second connecting arm.

18. The baler of claim 14, wherein at least one of the first connecting arm and the second connecting arm is an actuator.

* * * * *